(12) United States Patent
Goldner et al.

(10) Patent No.: US 7,224,872 B2
(45) Date of Patent: May 29, 2007

(54) RUGGED FIBER OPTIC ARRAY

(75) Inventors: Eric L. Goldner, Valencia, CA (US);
William Briggs, Willow Creek, CA (US)

(73) Assignee: Sabeus, Inc., Calabasas, CA (US)

( * ) Notice: Subject to any disclaimer, the term of this patent is extended or adjusted under 35 U.S.C. 154(b) by 0 days.

(21) Appl. No.: 10/528,126

(22) PCT Filed: Oct. 3, 2003

(86) PCT No.: PCT/US03/31266

§ 371 (c)(1),
(2), (4) Date: Nov. 14, 2005

(87) PCT Pub. No.: WO2004/034096

PCT Pub. Date: Apr. 22, 2004

(65) Prior Publication Data

US 2006/0120675 A1    Jun. 8, 2006

Related U.S. Application Data

(60) Provisional application No. 60/465,150, filed on Apr. 24, 2003, provisional application No. 60/463,295, filed on Apr. 16, 2003, provisional application No. 60/416,007, filed on Oct. 4, 2002.

(51) Int. Cl.
*G02B 6/44* (2006.01)

(52) U.S. Cl. .............. 385/104; 385/105; 385/108; 385/100; 385/102

(58) Field of Classification Search .............. None
See application file for complete search history.

(56) References Cited

U.S. PATENT DOCUMENTS

| 4,444,460 A | 4/1984 | Stowe |
| 4,468,091 A | 8/1984 | Schmadel |
| 6,211,964 B1 | 4/2001 | Luscombe |

*Primary Examiner*—Frank G. Font
*Assistant Examiner*—Eric Wong
(74) *Attorney, Agent, or Firm*—Fulwider Patton LLP (57) ABSTRACT

An array of fiber optic hydrophones or geophones is formed by winding of optical fiber around a continuous, yet flexible cylindrical core. The cylindrical core contains an elastomer filled with a specified percentage of voided plastic microspheres. The elastomer provides the necessary radial support of the optical fiber, and with the included voided microspheres, provides sufficient radial compliance under acoustic pressure for proper operation of the hydrophone. The cylindrical core can be made in very long sections allowing a plurality of fiber optic hydrophones to be wound onto it using a single optical fiber, with individual hydrophone elements separated by integral reflectors such as Fiber Bragg Gratings (FBSs). The center of the core may include a strength member and a central hollow tube for the passing of additional optical fibers. The aforementioned hydrophone array is then packaged within a protective outer coating or coatings as required for the specified application.

37 Claims, 4 Drawing Sheets

RUGGED FIBER OPTIC ARRAY

CROSS-REFERENCE TO RELATED APPLICATION

This application claims priority to U.S. Provisional Application Ser. No. 60/416,007, filed Oct. 4, 2002, U.S. Provisional Application Ser. No. 60/463,295, filed Apr. 16, 2003, and U.S. Provisional Application Ser. No. 60/465,150, filed Apr. 24, 2003, the entirety of which are expressly incorporated herein by reference.

BACKGROUND OF THE INVENTION

1. Field of the Invention

The present invention relates generally to an improved design and construction technique for fiber optic hydrophones and hydrophone arrays. More specifically, the present invention comprises a fiber optic hydrophone that has a continuous solid, yet compliant, elastomer core. In some embodiments, plastic microspheres have been added to the elastomer core to provide increased acoustic compliance.

2. Description of Related Art

There are many occasions when it is necessary to detect acoustic signals in an underwater environment. For example, geologic exploration is often carried out by setting small explosives below the ocean's, or other body of water's, surface, detonating the explosives, and then detecting the resulting acoustic signals to determine the structure of various features on or under the sea floor. Additionally, there is a need to be able to detect acoustic signals, such as the sounds emitted by ships, submarines, fish or other animals, that are transmitted under water.

Generally, where acoustic signals need to be sensed or detected in an underwater environment, sensors called hydrophones are used. In many instances, multiple hydrophones are joined together with a specified spacing between each hydrophone to form an array of hydrophones. Such arrays of multiple hydrophones are particularly useful compared to use of single hydrophones where it is necessary to determine the direction the acoustic signals are coming from, or to provide increased sensitivity so as to improve the likelihood of detecting faint acoustic signals.

Conventional hydrophone arrays consist of a series of many piezoelectric elements, or sensors, each of which produces a voltage proportional to the intensity of acoustic signals incident upon the hydrophone. Typical hydrophones available for use in such arrays at present have various circuitry or other electronics associated with the sensor elements located at each sensor in hydrophone. These associated circuits are used for amplification, filtering, digitization, multiplexing and the like of the signals produced by the piezoelectric sensors. Because these additional circuits or electronics are necessarily located underwater, the circuits and electronics are exposed to harsh conditions, such as extreme pressure due to the depth the hydrophone is deployed, or water leakage into the hydrophone housing. To protect the circuits, hydrophones typically include hermetically sealed armored housings. If the circuitry does fail, however, repair of the hydrophone requires that the hydrophone, or, as is typically the case, an entire array or portion of an array, may need to be retrieved from its underwater deployment for diagnosis and repair. Because such repairs are costly and time consuming, and may require the use of specialized vessels and equipment to retrieve the damaged hydrophones, there is a need for a more robust acoustic sensor.

One system that provides improved robustness and reliability uses fiber optic sensors as the sensor element in the hydrophone. Such fiber optic sensors typically use optical fiber wrapped in a high precision winding pattern around compliant, air-backed mandrels as the sensing medium. This arrangement is advantageous in that no additional circuitry or electronics are required at the location of the sensor, making the fiber optic sensors inherently more reliable than other types of conventional hydrophones used in hydrophone arrays.

In a fiber optic sensor, light is sent from a source located in a relatively benign environment through the optical fiber to the sensor. Acoustic pressure waves present in the water dynamically strain the fiber, resulting in a shift in the phase of the light transmitted in the optical fiber. The phase shifted light is compared to a reference signal, creating an interference pattern. The resulting light signal is then sent to an interrogator, which converts the light to an electrical signal for demodulation.

There are several shortcomings associated with presently available hydrophone arrays that use fiber optic sensors as the sensor element. One disadvantage of presently available fiber optic sensors is that the fiber generally is wrapped around discrete, hollow mandrels that are stiff enough to withstand the hydrostatic pressure requirements of deploying hydrophones under water, yet are compliant enough so that the acoustic pressure waves in the water can dynamically deform the mandrel, thereby straining the optical fiber resulting in a phase shift of the light transmitted through the fiber. Accordingly, the mandrels must be formed into sealed, relatively hard plastic or thin metal hollow cylinders that are leak proof against water under the required hydrostatic pressure. In general the mandrels used in presently available fiber optic sensors are stiff and unbendable. This is disadvantageous in that it is useful to be able to manufacture fiber optic sensor arrays in long continuous sections, and to store such arrays on circular drums, from which the fiber optic sensor array may be deployed and retrieved, and such long sections need to be flexible.

To facilitate the flexibility needed to store the fiber optic sensor arrays on a circular drum, the mandrels must be made into short cylindrical pressure vessels, such as, for example, capped tubes, with flexible links between the capped tubes to form long continuous bendable sections. A considerable amount of labor must be used to assemble the optic fiber wrapped on the air-backed mandrels into interferometers. This laborious process includes preparing the optical fiber, splicing and recoating the optical fiber, dressing the optical fiber, mechanically assembling the pressure vessels, and sealing and testing the vessels and optical fiber to ensure that the resulting assembly is water tight and functions as desired.

As fiber is wound around the long continuous, bendable sections, great care must be exercised to ensure that the mandrel/flexible link interfaces do not have any sharp or uneven surfaces, and do not separate, shift, or deform under pressure or tension, which will break the optical fiber. In addition, array strength members and extra optical fibers often must be placed along the outer surface of the continuous section, leading to optical fiber damage during reeling/unreeling operations as a result of friction, bending, crushing, and the like.

An additional shortcoming with air-backed mandrel optical fiber hydrophones is that such devices have a flat optical phase response to acoustic input as a function of acoustic frequency. This is disadvantageous in acoustic frequency ranges that contain unwanted acoustic signals, such as noise caused by fish, whales or other sound source, whose presence limits the dynamic range of the overall system unless very high sample rates are used by the system electronics to interrogate the sensors to allow signal analysis and canceling of the noise.

The spaces between and around the mandrels used for the fiber optic sensors may also be filled with a liquid in an attempt to provide improved acoustic coupling and thus sensor sensitivity as well as to improve or control the buoyancy of the array. Such construction may be disadvantageous because such liquid-filled fiber optic sensor arrays are susceptible to puncture during deployment and reeling operations as well as during normal operation, and leakage of the fluid typically results in failure of the array. Moreover, where a fluid such as kerosene or kerosene-like liquids or other possibly environmentally hazardous material is used, leakage of the fluid can contribute to unwanted pollution.

What has been needed, and heretofore unavailable, is a reliable, robust fiber optic acoustic sensor that has eliminates the disadvantages of air-backed or fluid filled arrays, yet provides for increased sensitivity and ease of manufacture. The present invention satisfies these and other needs.

SUMMARY OF THE INVENTION

The present invention overcomes many of the shortcomings associated with fiber optic hydrophone arrays manufactured in accordance with prior art methods.

The present invention eliminates the requirement for rigid, air-backed mandrels for the fiber optic hydrophones. Instead, long cylindrical segments of a continuously flexible elastomer form the base of the hydrophone structure. The optical fiber is wound onto the one-piece segments that are completely free of the rigid mandrel/flexible link interfaces and their associated problems. Compliance is provided to hydrophone through the use of voided plastic microspheres dispersed within the elastomer substrate. The hardness of the microsphere containing elastomer is controlled to meet the required acoustic sensitivity and the acoustic sensitivity versus depth requirements of a particular application.

One advantage of using an elastomer substrate is that the dynamic properties of the elastomer, such as, for example, bulk modulus and Poisson's ratio, may be altered as necessary to tailor the mechanical response of the sensor for an application. Such tailoring is useful, for example, to achieve mechanical roll-off of undesired (that, is, out of band) frequency response. The ability to suppress selected frequency ranges provides for limiting the bandwidth of the fiber optic sensors, reducing demands on the demodulation electronics, which historically require, using prior art sensors, sample rates that are orders of magnitude higher than that required to satisfy Nyquist criteria in order to maintain large dynamic ranges.

Further, replacing the individual sealed rigid mandrels with a flexible polymer allows the center core of the hydrophone or geophone segment to be used for passing extra optical fibers and/or a central strength member. Thus the central core of the hydrophone or geophone segment can be constructed similar to a standard high strength fiber optic telecommunications cable with the optical fiber protected in a thin metal tube surrounded by a rugged strength member and a tough outer jacket. Such a cable is inherently designed to withstand reeling/unreeling without stressing the optical fiber. In one embodiment of the present invention, the void filled elastomer is extruded on the outside of the core of the cable structure in a concentric fashion, thereby forming the base upon which to wind the optical fiber to form a hydrophone or array of hydrophones.

In another aspect of the present invention, the hydrophones of the present invention may be disposed within a hollow tube, with the remaining space within the tube filled with a liquid, as in a standard towed hydrophone array, or a low shear polymer compound that does not flow. The purpose of this filler is to isolate the hydrophones from longitudinal shear waves which cause noise in the output of the array.

In other aspects of the present invention, the outer surface of the hydrophone may be formed from a tough, abrasion resistant elastomeric cover, which provides turbulent boundary layer noise rejection. In one embodiment, microspheres may be added to the low shear polymer and/or the elastomeric cover as needed to adjust buoyancy of the hydrophone array. This embodiment is particularly advantageous in that the hydrophone may be used as is, that is, the fiber optic hydrophone may be towed without needing to be encased within a fluid filled tube, as is typical for fiber optic hydrophone arrays presently used.

In another aspect of the present invention, the hydrophone of the present invention may be constructed without the abrasion resistant cover. In one such embodiment, the hydrophone may be mounted within a fluid filled tube, as is typical in present towed hydrophone arrays.

In yet another aspect, the present invention is embodied in a continuous, flexible cylindrical device for detecting acoustic signals, comprising a flexible core including an acoustic substrate, an optical fiber wound around the acoustic substrate, and at least one periodic refractive index perturbation formed in the optical fiber. In another aspect, the acoustic substrate contains a plurality of voids. In still a further aspect, the voids are formed by hollow microspheres, which may be formed from a compliant material.

In still another aspect of the present invention, the flexible core includes a hollow tube for providing a passageway through the core. In one aspect, the flexible core includes a strength member for providing tensile strength to the core to resist stretching or breaking of the core during deployment, retrieval or use. In another aspect, the flexible core includes a strength member surrounding the hollow tube for providing tensile strength to the core to resist stretching or breaking of the core during deployment, retrieval or use.

Still another aspect of the present invention includes an intermediate jacket disposed between the metal tube and the central strength member. In one aspect, the jacket is disposed over the strength member.

In another aspect, the present invention includes an acoustic substrate including an elastomeric material having a selected dynamic property for limiting the sensor frequency response to within a desired range of frequencies.

In still another aspect, the optical fiber is wound under tension to form at least one optical hydrophone. In yet a further aspect, the present invention includes an embodiment wherein the optical fiber is wound under tension to form a plurality of optical hydrophones, with each of the hydrophones separated by a periodic refractive index perturbation. In one aspect, the periodic refractive index perturbation is a Bragg grating; in another aspect, the periodic refractive index perturbation is a long period grating.

In another aspect, the present invention may include a layer of tape disposed around the acoustic substrate under the optical fiber which may have a low coefficient of friction relative to a coefficient of friction of the fiber. The tape may be formed from Teflon or the like.

In still another aspect, the present invention may include a filler rod inter-wound on the acoustic substrate with the optical fiber such that the filler rod is disposed approximately parallel to the optical fiber. In one aspect the filler rod may be formed of nylon. In another aspect, the filler rod has a diameter equal to or larger than a diameter of the optical fiber. In yet another aspect, the filler rod and optical fiber are inter-wound around the acoustic substrate so that there is a space between adjacent turns of the wound optical fiber, the space being filled with a compliant material, such as a thermoplastic elastomer or depolymerized rubber.

In a further aspect, the present invention may include a tape layer disposed around the inter-wound filler rod and optical fiber. In one aspect, the tape layer is formed from a material having a low coefficient of friction relative to the optical fiber, such as Teflon or polyimide polymer.

Another aspect of the present invention an external layer formed from an elastomer, which may be void filled. In another aspect, the present invention may include an outer tube in which the flexible core and optical fiber are disposed, there also being a space between the outer tube and the flexible core and optical fiber; and a material disposed within the space, the material for coupling acoustic signals from the outer tube to the flexible core and optical fiber. In one aspect, the material is a fluid, such as Isopar or Norpar (ExxonMobil Chemical Co.); in another aspect, the material is a low shear modulus polymer.

In a still further aspect, the present invention may include an outer elastomeric layer disposed on the flexible core and optical fiber, the elastomeric layer including hollow microspheres dispersed through the elastomeric layer to adjust buoyancy.

Other features and advantages of the invention will become apparent from the following detailed description, taken in conjunction with the accompanying drawings, which illustrate, by way of example, the features of the invention.

DETAILED DESCRIPTION OF THE PREFERRED EMBODIMENTS

Referring now to the exemplary drawings, which illustrate, by way of example only, embodiments of the present invention, the present invention is generally embodied in a structure and method for forming that structure that includes a relatively flexible core through which extends an optical fiber. A series of reinforcing and protection layers are further wound around the core, one layer of which includes windings of an optical fiber in which are formed one or more gratings, such as long period or Bragg gratings. The entire structure may further be surrounded by an outer jacket. In some embodiments, the resulting cable-line structure may be extended through a protective cylinder formed from a material such as glass, metal, polymer or other material as needed to provide additional protection to the sensor of the present invention depending upon the environment in which the sensor is to be deployed.

Figure 1A:
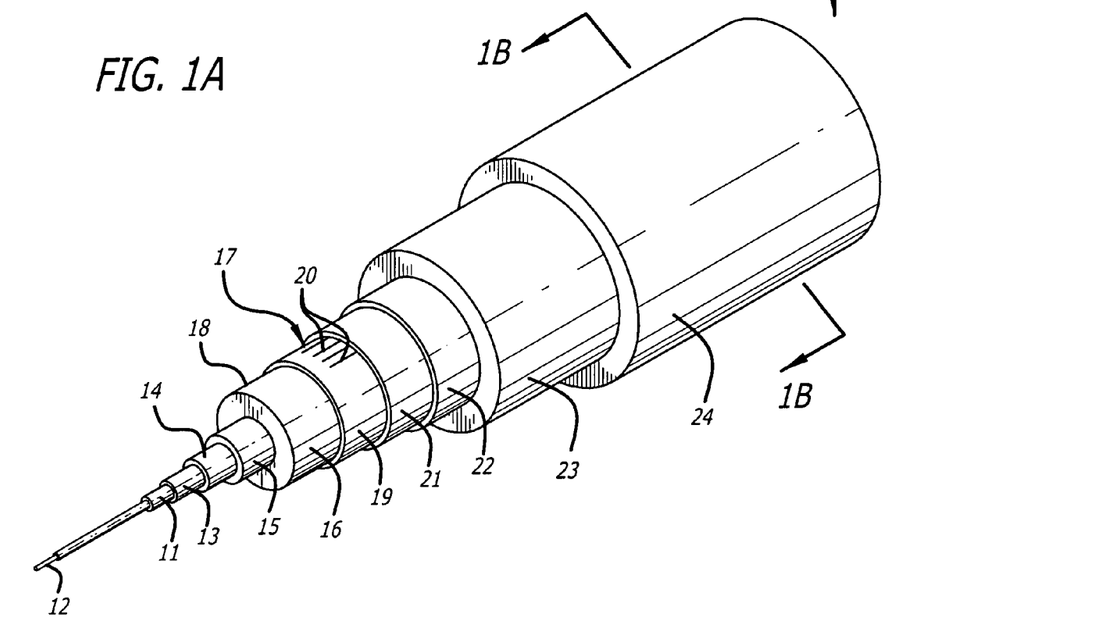
FIG. 1A is a perspective view of one embodiment of the present invention depicting an array of fiber optic acoustic sensors mounted on a flexible sub-core assembly and encased in a protective sheath.
Figure 1B:
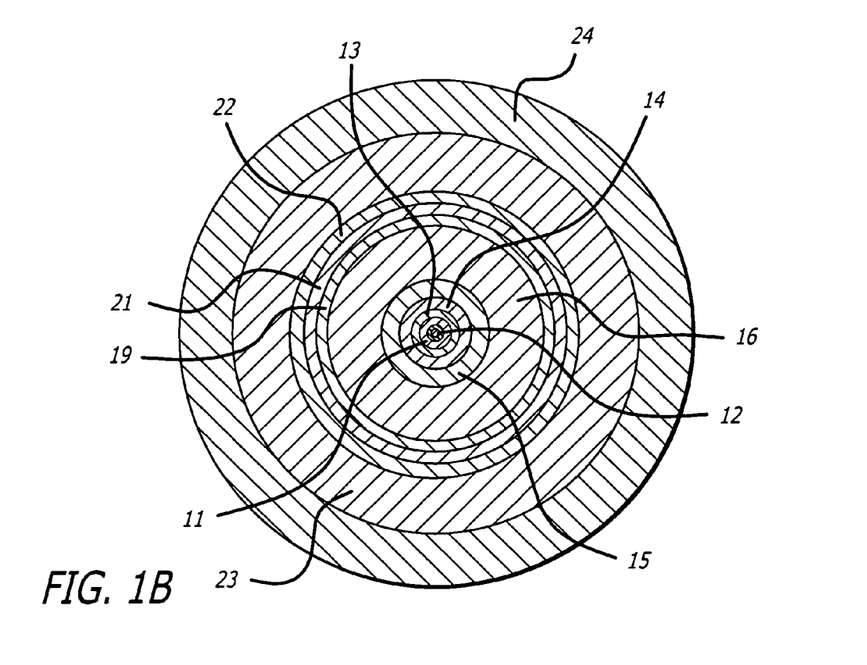
FIG. 1B is a cross-sectional view of the embodiment of the present invention depicted in FIG. 1A.

FIG. 1 is an overall view of one embodiment of a solid fiber optic hydrophone array 10 in accordance with the present invention. A core sub-assembly 18 is formed using various layers of materials as described below, and then wrapping an optical fiber 17 around the core sub-assembly.

In the embodiment depicted in FIG. 1, the core sub-assembly, starting from the innermost portion of the core, includes a durable hollow tube 11. This hollow tube may be formed from thin-walled metal tubing, such as, for example, but not limited to, 316 stainless steel, or other relatively flexible material suitable for use in the environment in which the hydrophone is to be deployed. The hollow tube 11 provides a space that extends throughout the entire length of the hydrophone or hydrophone array that may be used to house additional optical fibers 12, wires, or other communications means, that may be needed to send or receive signals from sensors or other equipment located downstream of the hydrophone or hydrophone array. Such a provision allows for a number of hydrophone arrays to be deployed using the same basic cable-like structure.

Hollow tube 11 my be surrounded by an intermediate elastomeric layer 13. This intermediate elastomeric layer may provide protection to the hollow tube, and may also act as an adhesive layer to aid in forming and attaching additional layers to the hollow tube 11. Typical materials that may be used are, for example, polyurethane and polyethylene.

Surrounding the elastomeric adhesive layer 13 is a strength member 14 made of metal wires or synthetic or natural fibers. For example, in one embodiment, the strength member layer 14 may be formed by closely winding a dense layer of synthetic fibers such as, for example, aramid fibers or Vectran, a product of Celanese Acetate LLC. The strength member limits the tensile strain transmitted to the hydrophone array structures during manufacture and deployment of the array to prevent failure of the assembly under the tensile strain forces experienced during deployment, retrieval and operational loading of the array assembly. It will be understood by those skilled in the art that other high strength natural or synthetic fibers may be used, depending on the design and operational specifications desired for a particular application. Moreover, in an embodiment of the present invention, electrical wires, such as twisted pairs of wires, may be wound around the hollow tube 11 before strength member 14 is added to the core sub-assembly.

The strength member 14 may be surrounded by an elastomer layer 15. Elastomer layer 15 encapsulates the inner layers of the core sub-assembly and also provides for maintenance of the radial uniformity of the strength member 14 and also may also provide a means for damping and isolating the hydrophone from vibration transmitted along the strength member 14. In some embodiments, elastomer layer 15 is surrounded by a layer 16 formed from a solid compressible material such as an elastomer. In one embodiment, the elastomer forming layer 16 may be a polyurethane or silicone rubber. In another embodiment, voids may be formed introduced within the solid compressible material with a material such as, for example, Expancel (Azko Nobel) closed cell polyethylene foam and the like.

Figure 2:
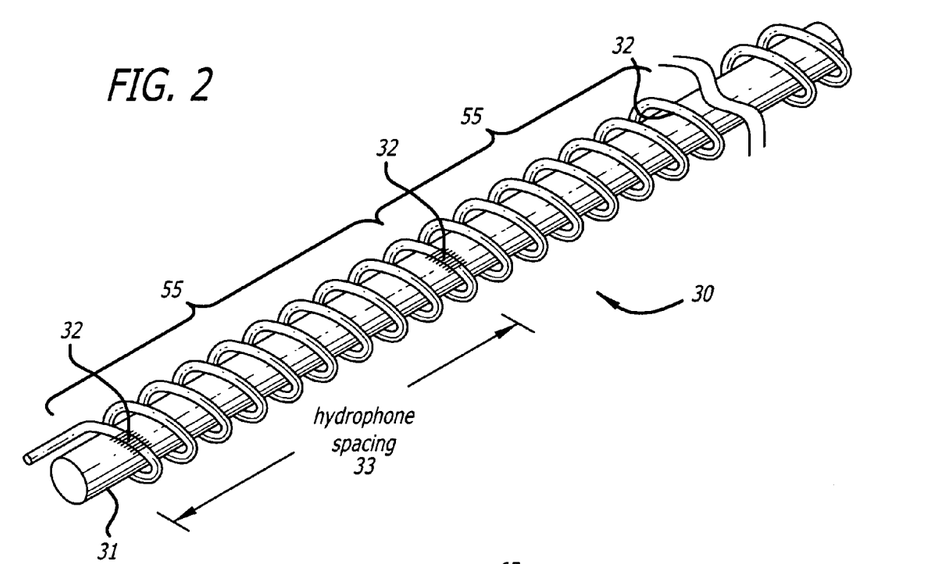
FIG. 2 is an enlarged perspective view of a portion of the embodiment of FIG. 1 illustrating the spacing of fiber optic hydrophone elements wound upon the flexible sub-core assembly.

Once layers 13, 14, 15 and 16 have been formed around hollow tube 11, the resulting core sub-assembly 18 is in the form of a long, continuous, flexible cylinder, which serves as the mounting base for the optical sensor fiber 17. Using methods known in the art, such as winding with a standard cable manufacturing taping head, the optical sensor fiber 17 is wrapped under a selected amount of tension, on the order of 100 grams, onto core sub-assembly 18 such that it remains under tension under all expected operating conditions of the hydrophone. Wrapping the fiber optic sensor 17 around core sub-assembly 18 in this manner ensures that an acoustic wave impacting the sensor will uniformly strain the optical sensing fiber. As shown in FIG. 2, fiber Bragg gratings, or long period gratings, may be incorporated into the optical sensor fiber 17 at appropriate intervals to form one or more acoustic sensors along the length of the hydrophone assembly.

As is known in the art, fiber Bragg gratings may be incorporated into an optical fiber using a variety of methods. One such method, for example, is described in U.S. Pat. No. 6,222,973, Fabrication of Refractive Index Patterns in Optical Fibers having Protective Optical Coatings, issued Apr. 24, 2001, the subject matter of which is incorporated herein by reference in its entirety.

Once the optical fiber 17 has been wound on the core sub-assembly, an adhesive may be applied to hold the optical fiber in position on the core sub-assembly. The adhesive may also be applied during the winding process. Prior to winding the optical fiber 17 onto the core sub-assembly 18, the core sub-assembly 18 may be wrapped or coated with a layer 19 of material, which may be in the form of a tape, such as, for example, but not limited to, Teflon (DuPont de Nemours Co.), polyimide or other suitable material, having a low coefficient of friction with respect to the jacket of the optical fiber 17. The addition of low friction layer 19 ensures that optical fiber 17 can move with respect to overlying layers during bending of the hydrophone 10, reducing or eliminating the introduction of longitudinal strain onto the optical fiber 17 that may result in tensile failure of optical fiber 17.

The optical fiber 17, including any gratings formed therein, may be uncoated, or it may be coated prior to winding with a metallic or non-metallic materials, depending on the needs of the particular application in which the hydrophone is to be used. Where a coating is applied, the optical fiber may be coating using known processes, such as pressure or tubing extrusion. Coating the optical fiber 17 prior to winding typically improves the acoustic sensitivity of the resultant sensor.

In an embodiment of the present invention where the optical fiber 17 is coated with a solid elastomer, or an elastomer that has been modified to include voids dispersed within the elastomer coating, the acoustic substrate of the hydrophone, layer 16, may be formed from a stiffer material than would otherwise be appropriate. For example, layer 16 may be formed from a polymer having a relatively higher elastic modulus of, for example, on the order of 80 or greater Shore A hardness, such as a suitable silicone polymer, or an incompressible polymer such as, for example, unfilled polyurethane or polyethylene. Forming layer 16 from such a material may be advantageous where reduced sensitivity of the fiber optic sensors is required, such as to hydrostatic pressures caused by deep deployment of the sensors in water, such as in the ocean, or in oil or gas wells.

The optical fiber 17 may be wound in parallel with a radial support rod 20. Radial support rod 20 may be made of a plastic material such as nylon, or other suitable material, and protects optical sensor fiber 17 during subsequent handling, including deployment, reeling and extrusion. Additionally, the interstitial volume between the optical fiber 17 and the radial support rod 20 may be filled with a low modulus material 21 such as a thermoplastic elastomer of the type typically used during standard cable manufacture to block diffusion of water into the cable structure, or, alternatively, with a material such as depolymerized rubber. Low modulus material layer 21 provides support for any subsequent tape and/or extruded protective layers, as well providing as isolation from external shear stresses on the hydrophone 10 that occur during or operation of the hydrophone 10.

In one embodiment of the present invention, a layer 22 formed from a material, such as Teflon, polyimide or the like, having a lower coefficient of friction than the jacket of the optical fiber 17 may be applied over low modulus material layer 21 to ensure radial consistency of the low modulus material 21. Layer 22 may be wound on the assembly as a layer of tape. Layer 22 is surrounded by a layer 23 formed from a low shear strength elastomer, such as, for example, polyurethane and silicone rubber and the like having a hardness on the order of approximately 30-40 on the Shore A scale. Acting as a noise reduction mechanism, layer 23 isolates the optical fiber 17 from longitudinally applied shear stresses that contribute to acoustic noise within the hydrophone.

The final layer applied to the hydrophone assembly is typically a tough elastomeric outer jacket 24. The outer jacket 24 protects the hydrophone 10 from mechanical handling, abrasion, deployment and operational stresses. Outer jacket 24 may be formed from a variety of suitable materials including, for example, polyurethane, polyethylene, nitrile rubber, or other materials having the desired physical characteristics.

While an embodiment of the present invention has been described as being surrounded by outer jacket 24, in other embodiments, the outer jacket 24, and layers 21, 22 and 23 may be omitted. However, such embodiments will likely need to be disposed within a fluid filled or solid filled tube to protect the hydrophone from damage, as is typical in presently available towed hydrophone arrays.

FIG. 2 illustrates the details of a hydrophone array 30 including a plurality of hydrophones 55 formed in accordance with the embodiment of the present invention described above. In this embodiment of the present invention, the plurality of hydrophones may be formed on a continuous core sub-assembly 31. Prior to winding, one or more fiber Bragg gratings 32 are written into an optical fiber 17 (FIG. 1) at predetermined intervals. This predetermined interval between gratings 32 (FIG. 2) becomes the hydrophone length 33, and may vary depending on the type and wavelength of the signals to be sensed, as well as the sensitivity and imaging capabilities desired. The length of optical fiber between each fiber Bragg grating is an individual sensing element 55. The optical fiber 17 is wound around core sub-assembly 31 at a pitch selected to maintain the required hydrophone acoustic sensitivity and spacing 33 based upon acoustic requirements.

Adjacent hydrophones in accordance with the present invention may be bound by gratings having different center wavelengths. For example, in one embodiment, a first hydrophone section is bounded by a grating having a first center wavelength and a second hydrophone section is bounded by a grating having a second, different center wavelength. An array of this type provides for wavelength division multiplexing, as the signals from both arrays will capable of separation and analysis using signal processing techniques well known in the art.

Figure 2A:
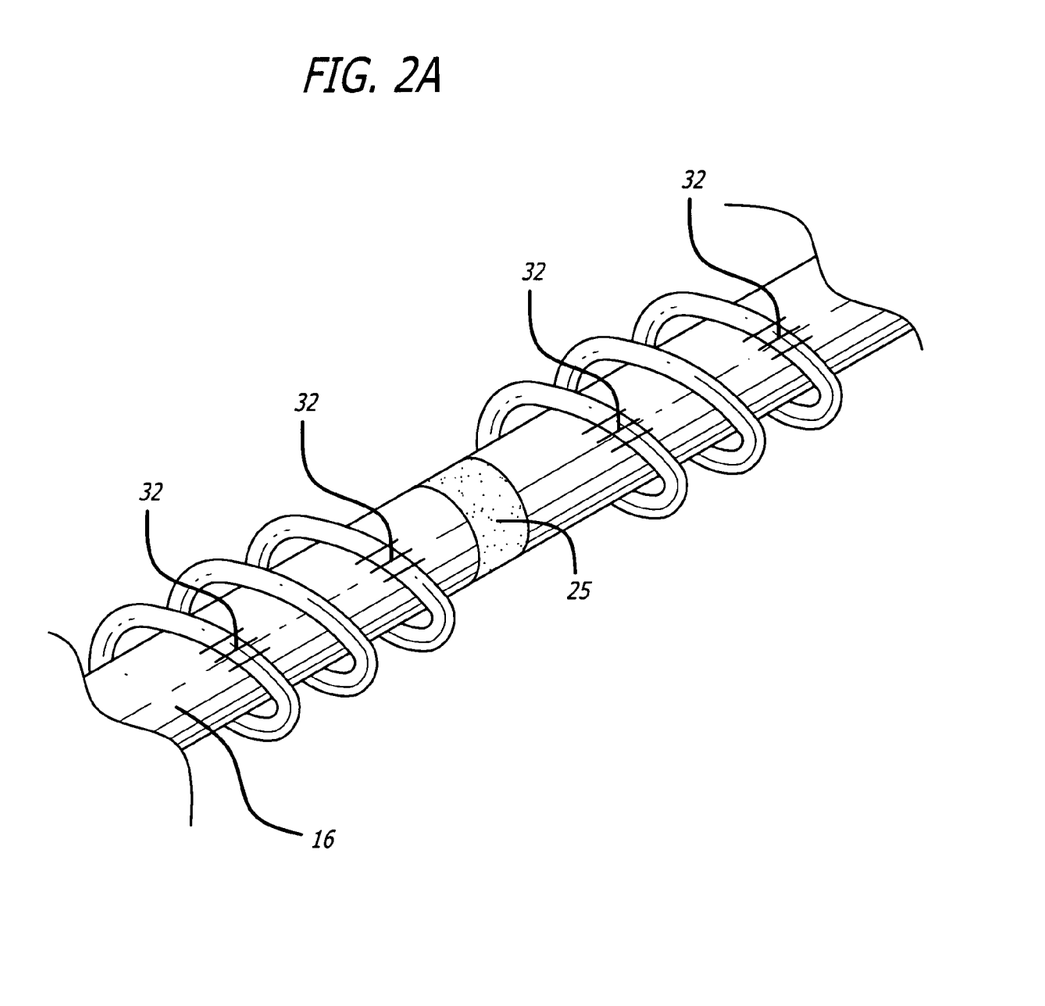
FIG. 2A is an enlarged perspective view of a portion of the embodiment of FIG. 1 illustrating the spacing of fiber optic hydrophone elements wound upon the flexible sub-core assembly and showing the use of a ring of low shear or high loss material disposed between adjacent windings of the fiber optic to decouple mechanical motion between the windings.

One potential problem is the occurrence of mechanical motion between adjacent sensors that may reduce the sensitivity of the array. Mechanical coupling of this kind may be reduced, or eliminated, by adding a thin layer of low shear material, such as, for example, polyurethane or the like having a Shore A hardness of approximately 30-40, between layer 15 and the acoustic substrate formed by layer 16. In an alternative embodiment, decoupling mechanical motion between adjacent sensors may be accomplished by substituting rings of low shear or high loss material 25, such as for example, polyurethane or the like having a Shore A hardness of approximately 30-40, in place of the acoustic substrate formed by layer 16 in segments between adjacent sensors, as shown in shown in FIG. 2A.

Figure 3:
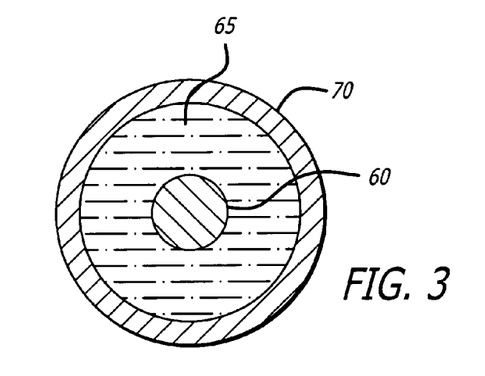
FIG. 3 is a perspective view, partially in cross-section, of an embodiment of the present invention where the hydrophone array is disposed within a fluid filled outer protective covering.

FIG. 3 illustrates an alternative embodiment of the present invention depicting a hydrophone 60 formed in accordance with the description above, but omitting the outer layers of the hydrophone assembly surrounding the optical fiber 17. In this embodiment, the hydrophone 60 is installed within a liquid-filled hydrophone array of the type commonly used in towed arrays. Hydrophone 60, which may also include outer layers and protective covering 24, is installed within a tube 70 that is filled with a liquid 65, such as, for example, Isopar or Norpar (ExxonMobil Chemical Company), or other suitable fluid. Tube 70 serves to protect the hydrophone 60, while the fluid 65 acoustically couples the hydrophone to the exterior cases to reduce, to the extent possible, attenuation of acoustic signals transferred from the exterior of tube 70 to the hydrophone 60, and decouples shear stress between the tube 70 and the hydrophone 60.

Figure 4:
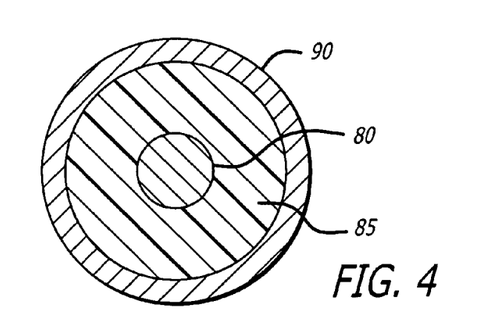
FIG. 4 is a perspective view, partially in cross-section, of another embodiment of the present invention where the hydrophone array is disposed within an outer protective covering and where the space between the hydrophone array and the outer covering is filled with a low shear solid material.

FIG. 4 illustrates yet another embodiment of the present invention depicting a hydrophone 80 formed in accordance with the description above, but omitting the outer layers of the hydrophone assembly surrounding the optical fiber 17, although there is no requirement to remove the outer layers, and the device would function acceptably if the outer layers were in place. In this embodiment, the hydrophone 80 is installed within a hydrophone array having an outer jacket 90. Hydrophone 80 is installed within a tube 90, designed to protect the hydrophone, that is filled with a low shear strength solid fill material 85 such as a polymer which may also include voids dispersed throughout the polymer to improve acoustic coupling of acoustical signals to the hydrophone 80 to reduce, to the extent possible, attenuation of acoustic signals transferred from the exterior of tube 90 to the hydrophone 80 while decoupling shear stress between the tube 90 and the hydrophone 80.

Figure 5:
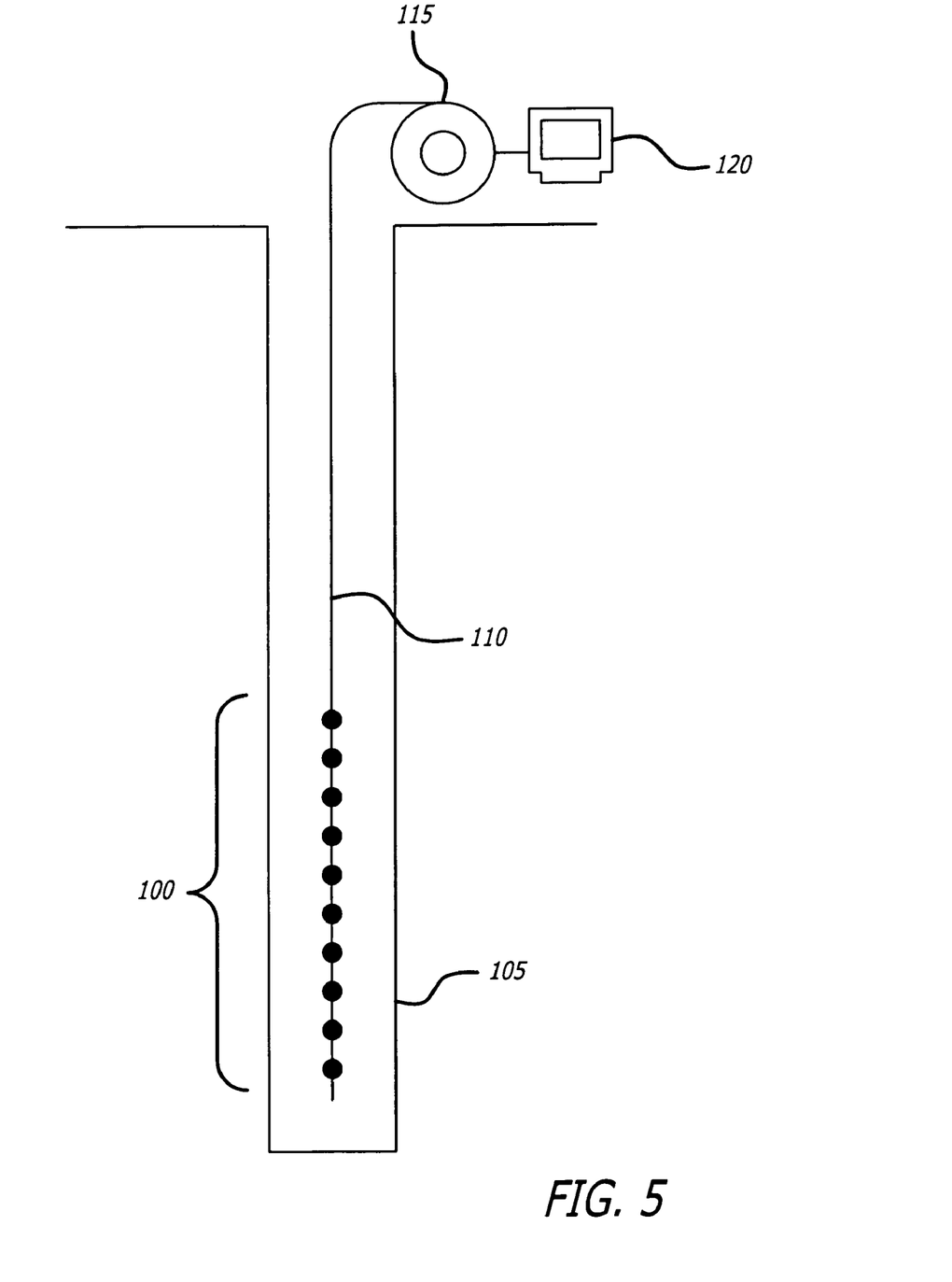
FIG. 5 is a schematic view illustrating deployment of a hydrophone array in accordance with one embodiment of the present invention down a well bore.

FIG. 5 illustrates one application utilizing a hydrophone array in accordance with present invention deployed in a bore hole. A borehole hydrophone array 100 in accordance with the present invention may be deployed in an oil or gas well 105, or any other bore hole such as a geothermal well. A lead cable 110 incorporating a fiber optic for transmitting signals to and from the array 100 is used to lower the array 100 using deployment apparatus 115 into the well. Lead cable 110 is connected to an acoustic receiver 120, which may contain all of the electronics and optical components necessary to provide a light beam down the optic fiber and into the array 100, and also to analyze the phase shifts in the signals returning from the array and to convert those signals into a form representative of the received acoustic signals that may be displayed, printed or further analyzed. Additionally, interrogator 120 may configured to communicate with additional processing equipment, such as a computer or computer network. The communications may occur either over wires or other hard connections, including optical networks, or the communications may occur wirelessly.

It will be apparent to those skilled in the art that the core sub-assembly and outer layers can be manufactured in continuous, one piece, homogeneous sections, using standard cable manufacturing techniques, such as extrusion and winding. These sections of the core sub-assembly can be wound with a continuous optical fiber to create hydrophone arrays, with fiber Bragg gratings spaced at appropriate intervals to provide the desired sensor spacing. These continuous, one piece sections containing the arrays may be wound upon commonly available spools and deployed using deployment equipment commonly available. The novel features of the present invention thus provide a system and method for providing easily deployable arrays of hydrophones or geophones that are rugged and capable of withstanding harsh environments.

While several particular forms of the invention have been illustrated and described, it will be apparent that various modifications can be made without departing from the spirit and scope of the invention.

What is claimed is:

1. A continuous, flexible cylindrical device for detecting acoustic signals, comprising:
   a flexible core including an acoustic substrate, the acoustic substrate containing a plurality of hollow microspheres;
   an optical fiber wound around the acoustic substrate; and
   at least one periodic refractive index perturbation formed in the optical fiber.

2. The device of claim 1, wherein the microspheres are formed from a compliant material.

3. The device of claim 1, wherein the flexible core includes a hollow tube for providing a passageway through the core.

4. The device of claim 1, wherein the flexible core includes a strength member for providing tensile strength to the core to resist stretching or breaking of the core during deployment, retrieval or use.

5. The device of claim 3, wherein the flexible core includes a strength member surrounding the hollow tube for providing tensile strength to the core to resist stretching or breaking of the core during deployment, retrieval or use.

6. The device of claim 4, further comprising an intermediate jacket disposed between the metal tube and the central strength member.

7. The device of claim 4, further comprising a jacket disposed over the strength member.

8. The device of claim 6, further comprising a jacket disposed over the strength member.

9. The device of claim 1, wherein the acoustic substrate includes a an elastomeric material having a selected dynamic property for limiting the sensor frequency response to within a desired range of frequencies.

10. The device of claim 1, wherein the optical fiber is wound under tension to form at least one optical hydrophone.

11. The device of claim 10, wherein the optical fiber is wound under tension to form a plurality of optical hydrophones, with each of the hydrophones separated by a periodic refractive index perturbation.

12. The device of claim 11, wherein the periodic refractive index perturbation is a Bragg grating.

13. The device of claim 11, wherein the periodic refractive index perturbation is a long period grating.

14. The device of claim 1, further comprising a layer of tape disposed around the acoustic substrate under the optical fiber.

15. The device of claim 14, wherein the tape has a low coefficient of friction relative to a coefficient of friction of the fiber.

16. The device of claim 14, wherein the tape is formed from Teflon.

17. The device of claim 1, further comprising a filler rod, the filler rod inter-wound on the acoustic substrate with the optical fiber such that the filler rod is disposed approximately parallel to the optical fiber.

18. The device of claim 17, wherein the filler rod is formed from nylon.

19. The device of claim 17, wherein the filler rod has a diameter equal to or larger than a diameter of the optical fiber.

20. The device of claim 19, wherein the filler rod and optical fiber are inter-wound around the acoustic substrate so that there is a space between adjacent turns of the wound optical fiber, the space being filled with a compliant material.

21. The device of claim 20, wherein the compliant material is a thermoplastic elastomer.

22. The device of claim 20, wherein the compliant material is depolymerized rubber.

23. The device of claim 21, further comprising a tape layer disposed around the inter-wound filler rod and optical fiber.

24. The device of claim 23, wherein the tape layer is formed from a material having a low coefficient of friction relative to a coefficient of friction of the optical fiber.

25. The device of claim 24, wherein the material is Teflon.

26. The device of claim 24, wherein the material is a polyimide polymer.

27. The device of claim 1, wherein the optical fiber includes an external layer formed from an elastomer.

28. The device of claim 27, wherein the elastomer is void filled.

29. The device of claim 1, further comprising:
an outer tube in which the flexible core and optical fiber are disposed, there also being a space between the outer tube and the flexible core and optical fiber; and
a material disposed within the space, the material for coupling acoustic signals from the outer tube to the flexible core and optical fiber.

30. The device of claim 29, wherein the material is a fluid.

31. The device of claim 29, wherein the material is a low shear modulus polymer.

32. The device of claim 30, wherein the fluid is Isopar.

33. The device of claim 30, wherein the fluid is Norpar.

34. The device of claim 29, further comprising an outer elastomeric layer disposed on the flexible core and optical fiber, the elastomeric layer including hollow microspheres dispersed through the elastomeric layer to adjust buoyancy.

35. The device of claim 29, wherein the material is an elastomeric material having a plurality of microspheres dispersed throughout the elastomeric material for providing pressure-compensated structural support for the flexible core and optical fiber.

36. The device of claim 11, further comprising a ring of low shear material disposed between at least one pair of adjacent optical hydrophones.

37. The device of claim 1, wherein the microspheres are formed from Expancel.

* * * * *

UNITED STATES PATENT AND TRADEMARK OFFICE
CERTIFICATE OF CORRECTION

PATENT NO. : 7,224,872 B2 Page 1 of 1
APPLICATION NO. : 10/528126
DATED : May 29, 2007
INVENTOR(S) : Eric L. Goldner et al.

It is certified that error appears in the above-identified patent and that said Letters Patent is hereby corrected as shown below:

Column 10, line 63, delete "claim 4" and insert --claim 5--.

Signed and Sealed this

Thirtieth Day of October, 2007

JON W. DUDAS
*Director of the United States Patent and Trademark Office*